Oct. 27, 1936.    A. J. BLACK    2,058,763
METHOD OF AND APPARATUS FOR FEEDING GLASS
Filed March 5, 1935    4 Sheets-Sheet 1

INVENTOR
Andrew J. Black,
By Archworth Martin,
Attorney.

Oct. 27, 1936.   A. J. BLACK   2,058,763
METHOD OF AND APPARATUS FOR FEEDING GLASS
Filed March 5, 1935   4 Sheets-Sheet 2

INVENTOR
Andrew J. Black,
By Archworth Martin,
Attorney.

Oct. 27, 1936.   A. J. BLACK   2,058,763
METHOD OF AND APPARATUS FOR FEEDING GLASS
Filed March 5, 1935   4 Sheets-Sheet 3

INVENTOR
Andrew J. Black,
By Archworth Martin,
Attorney.

Oct. 27, 1936.   A. J. BLACK   2,058,763
METHOD OF AND APPARATUS FOR FEEDING GLASS
Filed March 5, 1935   4 Sheets-Sheet 4
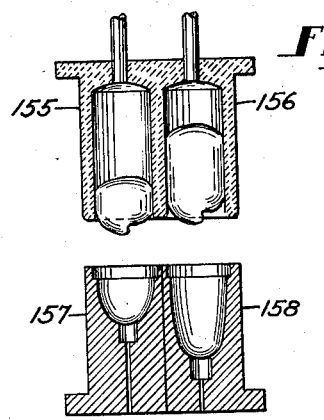
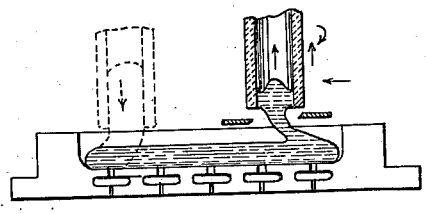
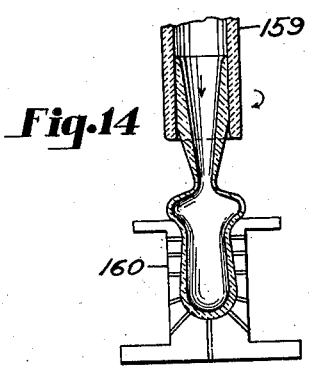
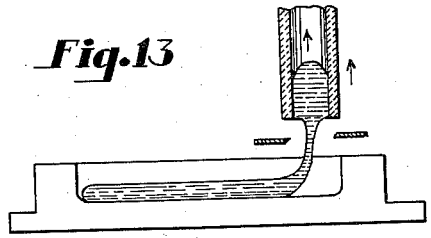
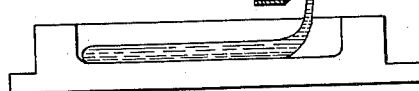
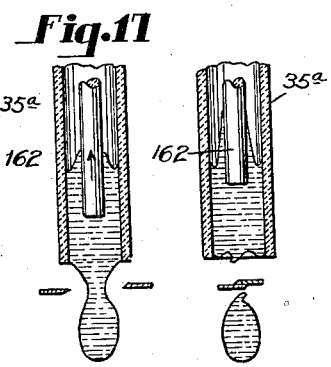
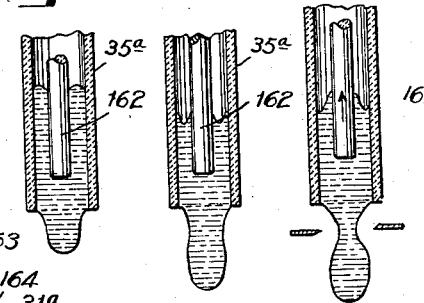
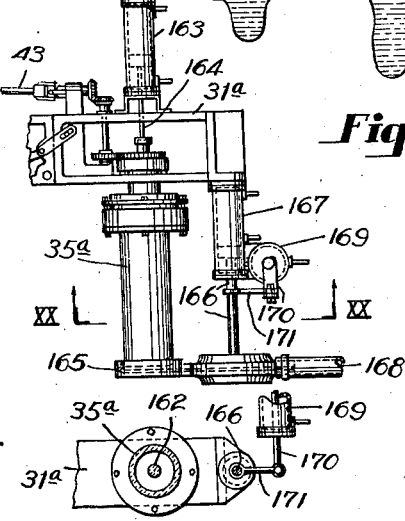
INVENTOR
Andrew J. Black,
By Archworth Martin,
Attorney.

Patented Oct. 27, 1936

2,058,763

UNITED STATES PATENT OFFICE 2,058,763

METHOD OF AND APPARATUS FOR FEEDING GLASS

Andrew J. Black, Butler, Pa., assignor to Harold M. Black, Jeannette, Pa.

Application March 5, 1935, Serial No. 9,401

24 Claims. (Cl. 49—62)

My invention relates to a method of and apparatus for feeding charges of molten glass to the molds of glass blowing machines, glass-pressing machines, or other forming devices.

My invention relates to feeders of the type wherein pressure and suctional impulses are applied to the surface of a body of glass contained within a bell or feeder tube, suction being applied to draw a quantity of molten glass into the tube, and the vacuum being relieved, and perhaps pressure applied, to cause formation of suspended masses of glass which are sheared to form the mold charges.

One object of my invention is to provide feeding apparatus that can be readily placed in co-operative relation with a glass tank or forehearth, and a forming machine.

Another object of my invention is to provide a feeding apparatus of such form that the forehearth or tank from which the glass is drawn can be at approximately the same height from the floor as the forming machine, thus avoiding the necessity of elevating the tank or making a pit for the forming machine, as is required in most types of installations.

Another object of my invention is to provide automatic means for feeding forming machines of the types that have heretofore been fed manually.

A further object of my invention is to provide a method whereby there will not be such excessive heating of the clay tube or bell as will result in the "fading" of tints or colors out of the glass.

Another object of my invention is to provide an improved means for withdrawing clean glass of proper temperature, and without streaks, from a pool of molten glass.

Another object of my invention is to provide feeding apparatus of such form that a mass of glass drawn from the bath at a single operation can be utilized to form a plurality of mold charges.

Still another object of my invention is to provide a simplified and improved form of glass-feeding apparatus.

Figure 1:
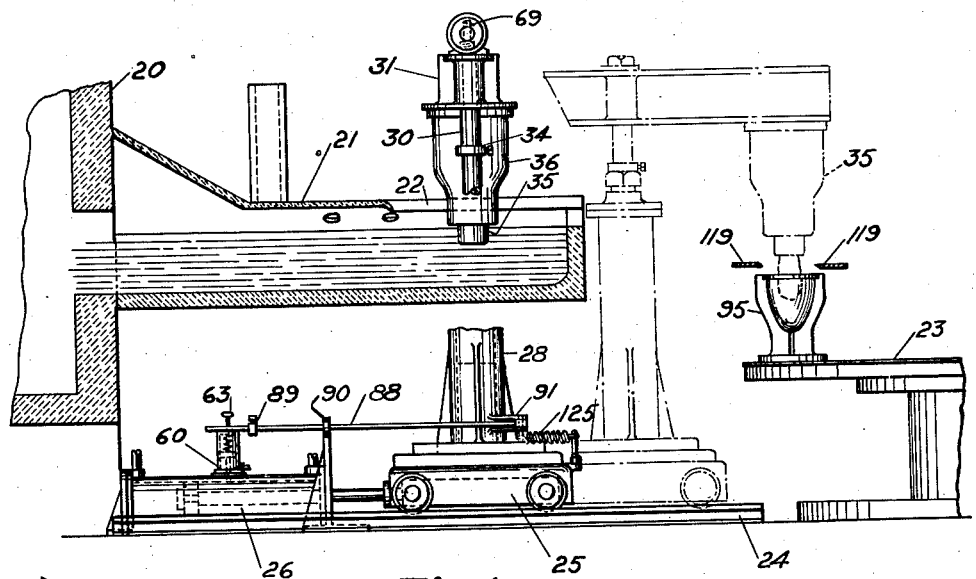
Figure 2:
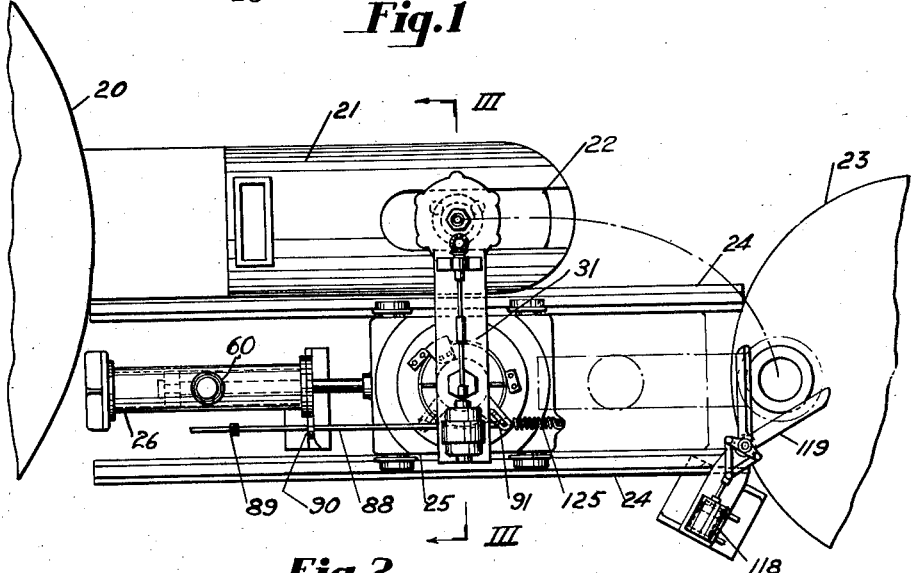
Figure 3:
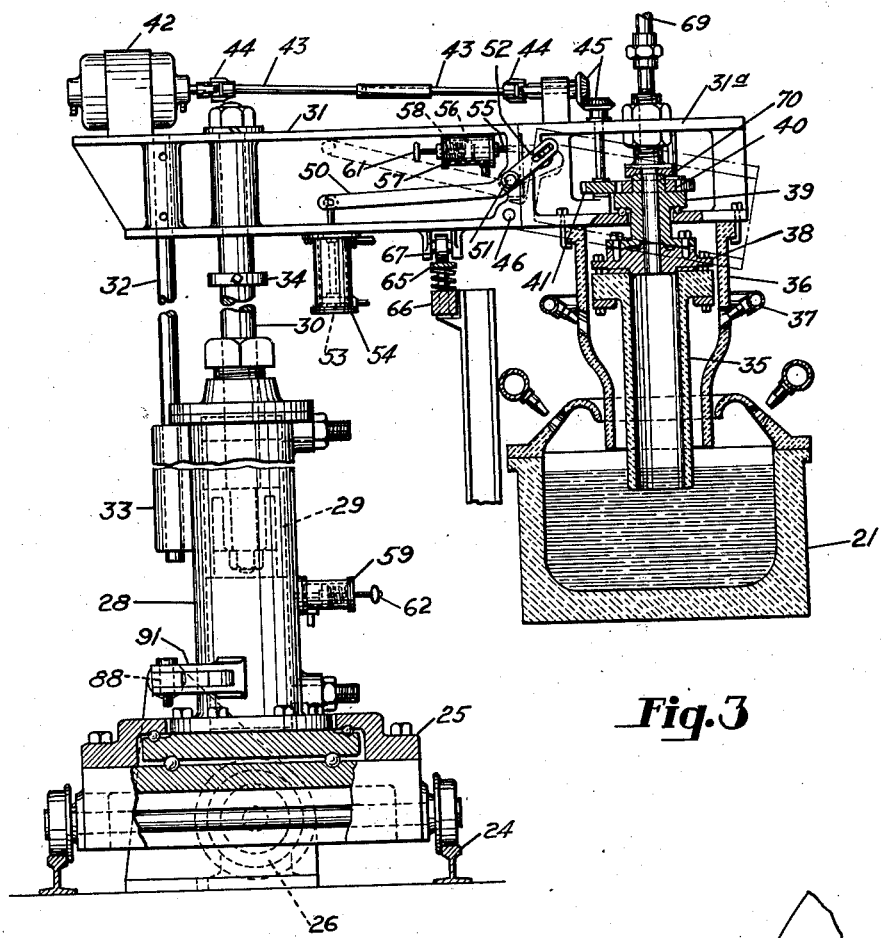
Figure 10:
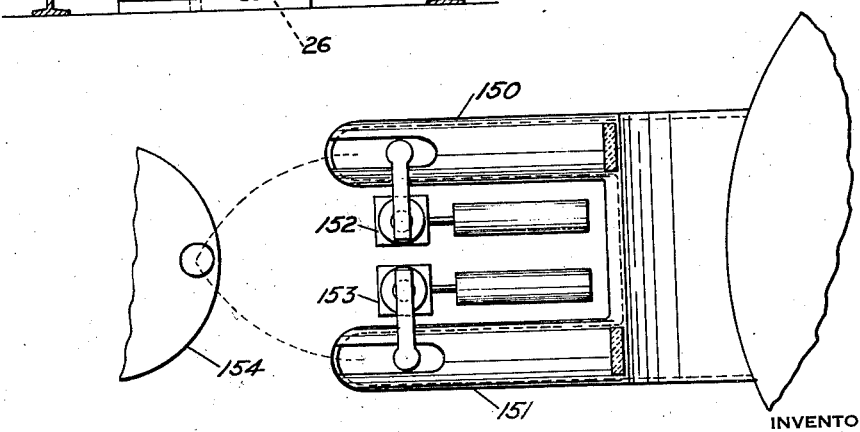
Figure 4:
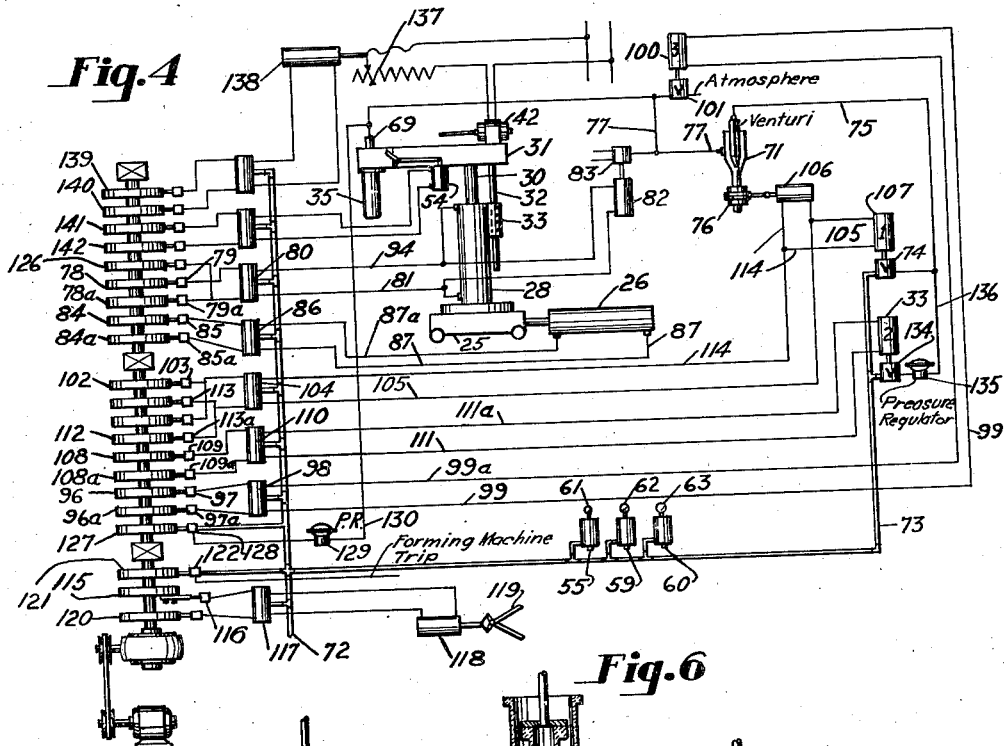
Figure 5:
Figure 6:
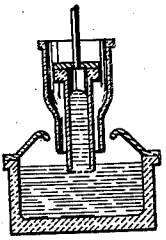
Figure 6:
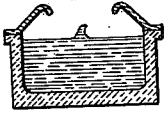
Figure 7:
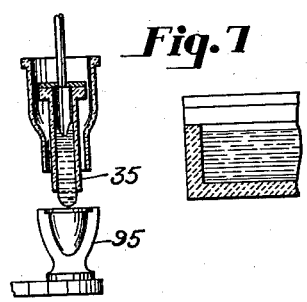
Figure 8:
Figure 9:
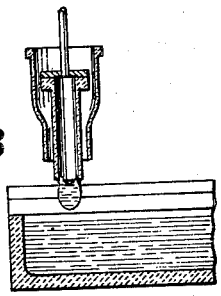
Figure 9:
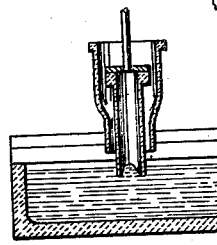

Some forms of apparatus for practising my invention are illustrated in the accompanying drawings wherein Figure 1 is an elevational sectional view; Fig. 2 is a plan view thereof; Fig. 3 is a view taken on the line III—III of Fig. 2, on an enlarged scale; Fig. 4 is a diagrammatic view showing the air control and pipe arrangement for the apparatus; Fig. 5 is a cross-sectional view through the forehearth and feeder tube or bell at one stage of operation; Fig. 6 is a similar view at another stage of the operation; Fig. 7 is a view showing the feeder tube positioned over a mold; Fig. 8 is a view showing the manner in which the tube is cleared of glass preparatory to taking up a new charge; Fig. 9 shows the operation of drawing a new charge of glass into the tube; Fig. 10 shows a modification of the furnace arrangement of Fig. 2; Fig. 11 shows the manner in which two molds may be supplied simultaneously with charges; Fig. 12 is a view showing the manner in which glass may be deposited in a mold of elongated form; Fig. 13 is a similar view showing another manner in which the glass charge is deposited in the mold; Fig. 14 shows a manner in which the feeder may be utilized in forming paste mold ware; Figs. 15 to 18 show various stages of operation wherein a needle or plunger is employed in connection with the feeder tube; Fig. 19 is a side view showing a modification of a portion of the structure of Fig. 3, and Fig. 20 is a view taken on the line XX—XX of Fig. 19.

Referring first to Figs. 1 to 3, I show a glass-refining furnace 20 provided with a boot or forehearth 21 that has a cover which is provided with an elongated opening 22 into which the feeder tube may be inserted for the purpose of withdrawing masses of glass from the forehearth. A mold table is indicated by the numeral 23 and a track 24 is positioned alongside the boot 21 and extends in proximity to the mold table.

A carriage 25 is movable back and forth on the tracks 24 by the use of a piston and cylinder 26, air being periodically admitted to opposite ends of the cylinder as will be hereinafter explained.

A column 28 is mounted on the carriage 25, as shown more clearly in Fig. 3, so as to have rotative movement thereon. A piston 29 is contained within the column 28 and carries a piston rod 30 that serves to support a beam 31 that carries the feeder apparatus, it being raised and lowered through admission of fluid pressure to opposite sides of the piston 29, as hereinafter explained. A guide rod 32 is secured to the beam 31 and extends through a bracket or sleeve 33 in order to prevent relative rotative movements as between the piston rod or post 30 and the column 28. A collar 34 is adjustably secured to the post 30 to limit downward movement of the beam 31. By adjusting the collar 34, the feeder tube is prevented from being lowered too closely to the molds into which the charges are to be fed.

The beam 31 at its outer end supports a feeder tube or bell 35 which is encased in a hood 36 to which heat may be supplied through burner nozzles 37 in order to prevent excessive chilling of the tube when it is out of the forehearth and during the time that it is depositing glass in the mold.

A cap 38 is secured to the tube and is in turn connected to a hub 39 that is supported in suitable bearings upon a pivotal extension 31a of the beam 31. The hub 39 carries a gear wheel 40 which meshes with a pinion 41. The tube is rotated about a vertical axis by a motor 42 that operates through an extensible or telescopic shaft 43 having universal joints 44 at its end. A bevel gear driving connection 45 is provided between the shaft 43 and the pinion 41. The extensible shaft 43 and the universal joint 44 are provided so that driving connection will be maintained between the motor 42 and the gear wheel 40 during movement of the beam section 31a about its pivot 46, as will be hereinafter explained.

While the beam extension 31a is normally maintained to hold the feeder tube 35 in vertical position as shown in Fig. 3, it may be oscillated about its pivot to cause the lower end of the feeder tube to move through a long arc in order to lay a mold charge flatwise in certain types of mold. This swinging movement is effected by means of a crank lever 50 that is pivoted at 51 to the beam 31, its one end 52 having lost-motion connection with a pin 52 which is carried by the extension 31a. The other end of the lever 50 has connection with a piston 53 that is operated by means of pressure admitted to a cylinder 54.

A safety latch 55 is carried by a piston 56 which is mounted in a cylinder 57. Pressure is normally present in the cylinder 57 to hold the piston in its rearward position against the compression of a spring 58. If for any reason, there is failure of fluid pressure, the latch 55 will be projected forwardly to maintain the extension 31a in its uppermost position in order to prevent damage to the parts, such as would occur if operations were again initiated with the extension 31a and the feeder tube in their lower position.

Similarly, a safety latch 59 is provided for the piston 29, the latch being normally held in release position by air pressure so that movements of the piston 29 will not be interfered with. Upon failure of air pressure, the latch pin will be projected inwardly to prevent movement of the piston 29. Similarly, a safety latch device 60 is provided for preventing movements of the piston in the cylinder 26 at inopportune times. When the latches 55, 59 and 60 have been moved to locking position, they close the inlet ports to their respective cylinders, so that they will not be automatically moved to release position when pressure is restored in the lines. Manual withdrawal to release positions after restoration of fluid pressure is effected by pull knobs 61, 62 and 63, respectively.

With the parts positioned as shown in Figs. 1, 2 and 3, the beam 31 is disposed transversely of the carriage 25 and the feeder tube 35 extends into the glass in the forehearth. The movement of the tube into the glass is limited by a spring cushioned stop bar 65 that is mounted upon a bracket or bar 66 which is suitably secured to the furnace framework. The beam 31 carries a roller 67 that is brought to rest upon the stop bar 65.

As shown in Fig. 1, the feeder tube and the carriage 25 are nearly at their rearward limits of movement, and suction is being applied to the upper end of the tube to draw in a charge of glass through a pipe 69 that has swivel connection at 70 (Fig. 3) with the upper end of the hub 39 which is provided with a conduit that affords communication between the pipe 69 and the tube 35.

Upon completion of rearward movement of the carriage 25, a complete charge has been drawn into the tube as shown in Fig. 5. During operation of taking up a charge of glass, the tube is rotated by the motor 42, as before explained, which causes a slight swirling of the glass, thereby causing commingling of glass which is of uneven texture or color and reducing danger of producing streaky ware.

As shown in Fig. 4, suction is created in the tube to draw up a charge of glass through the generation of a vacuum condition at 69 by a Venturi tube 71. A main air line 72 supplies air for operating various parts of the mechanism. There is constant supply of air from the line 72 through a pipe 73 to a valve 74, which at this time is open, so that air can flow through the pipe 75 to the Venturi tube 71, the air exhausting to the atmosphere past a valve 76 so that suction is created in the line 77 which leads to the tube 35.

When sufficient glass has been drawn into the tube and the carriage has reached its rearward limit of movement, air is admitted to the cylinder 28 to raise the beam 31 and the feeder tube from the forehearth 21. This admission of air is effected by a cam 78, which opens a bleeder valve 79 that releases pressure from one end of a reversing valve 80 of any well-known type, the reversing valve 80 operating to effect communication between the air line 72 and line 81 that leads to the lower end of the cylinder 28, thereby causing the beam 31 to be raised.

The line 81 extends to a piston motor 82 that is actuated to open a bleed valve 83 which will partially relieve the vacuum in the tube and reduce the suctional force to such degree that the glass charge will be maintained in the lower portion of the feeder tube while it is being transferred into position above a mold. The glass drawn into the tube is separated from the main body of glass during raising of the tube by speeding up the motor 42 in a manner to be hereinafter described in order to rotate the tube rapidly and twist off the adhering stream of glass, as indicated in Fig. 6.

After the tube 35 is raised, a cam 84 operates a bleed valve 85 to actuate a reversing valve 86, so as to establish communication between the air line 72 and a pipe 87 to the rear end of the cylinder 26, whereby the carriage is caused to travel forwardly toward the mold table. As the carriage approaches the limit of its forward movement, a rod 88 carried by the column 28 has its stop 89 brought into engagement with a bracket 90. This stop is adjustable to permit variation in the range of swinging movement. The forward end of the rod 88 is pivotally connected to the column through a bracket 91, so that when the stop 89 engages the post 90, the column will be rotated so as to swing the beam 31 a distance of 90°, bringing it into position above a mold 95, as shown by dotted lines in Figs. 1 and 2.

At this time, a cam 78a operating through a bleed valve 79a actuates the reversing valve 80 to cut off pressure through the line 81 and admit fluid pressure to line 94, and thence to the upper end of the cylinder 28, so that the tube 35 will be lowered into proximity with a mold, as shown in Fig. 7. The stop 34 positively limits the extent of lowering movement of the tube so that it will not be brought too close to the mold. Pressure from the line 94 will flow to the motor 82 to effect closing of the bleed valve 83.

Simultaneously with operation of the valve 79a, a cam 96 operates a valve 97 to effect operation of a reversing valve 98 that will admit fluid pressure from the line 72 to the line 99, and thence to a motor 100 which actuates a bleed valve 101 that will effect communication of the line 77 directly with the atmosphere, and hence relieve the vacuum condition within the tube 35. The glass within the tube will then move downwardly as shown in Fig. 7, and when it has partially emerged from the tube, air pressure will be supplied to the tube to cause the suspended mass of glass to form a desired shape instead of streaming out.

A cam 102 actuates a bleeder valve 103 to operate a reversing valve 104, thereby establishing communication between the line 72 and the line 105. This pressure will operate an air motor 106 to close the valve 76, and also operates an air motor 107 to close the valve 74. The bleeder valve 101 is closed by a cam 96a operating through a bleeder valve 97a, the reversing valve 98, and a line 99a.

Pressure is supplied to the tube 35 by a cam 108 operating a valve 109 to effect operation of reversing valve 110 that admits pressure from line 72 to a line 111 that communicates with an air motor 133. The motor 133 opens valve 134 to admit pressure from line 72, line 73, past a pressure regulator 135 to a line 136 connected to the line 75. From line 75, the regulated air pressure flows through venturi 71, line 77 to the interior of the tube 35, the valves 74, 76, 83 and 101 being closed at this time. As above-mentioned, this air causes the suspended glass to form a desired shape, whereupon the valve 134 is closed by operation of motor 133. Cam 108a, valve 109a actuates valve 110 to cut off pressure to line 111 and to admit pressure to line 111a which actuates motor 133. The extrusive pressure will not be necessary in all cases, especially when depositing glass as in Figs. 12 and 13.

A cam 112 operates a bleeder valve 113a and the reversing valve 104 to cause flow of pressure to line 114 and actuate the air motors 106 and 107 in a direction to open the valves 76 and 74, thereby again causing flow through the venturi and suction within the tube 35. The suction thus created causes the necking of the gob or suspended charge of glass. Thereupon a cam 115 operating through a bleeder valve 116 and a reversing valve 117 admits air to a shear cylinder 118 to effect closing of the shears 119 and severance of the mold charge. A cam 120 conveniently admits fluid to the other end of the cylinder 118 to effect opening of the shears.

In the sequence of operations last-described, following the admission of expulsive pressure, the tube can remain in mold-charging position and the feeding operations repeated, since there is sufficient glass in the tube to form a plurality of mold charges. The interval between the cycles of feeding operations is sufficient to permit the bringing of successive molds into charging position.

The mold table 23 can be moved in any suitable manner, the step-by-step movements thereof being controlled by fluid pressure impulses periodically applied to a control cylinder by a cam 121 and a valve 122.

After completion of shearing operations, there will commonly be present in the tube a small slug of glass which is carried back to the tank and ejected. The presence of some glass in the tube facilitates the forming of a properly-shaped mold charge. The tube 35 is raised from mold-charging position by the admission of fluid pressure to the lower end of the cylinder 28, as heretofore described, and retractive movement of the carriage is effected by the admission of fluid pressure to the front end of the cylinder 26. A cam 84a operates a bleed valve 85a and the reversing valve 86 to admit fluid pressure through line 87a to the front side of the cylinder 26. During retractive movement of the carriage, a spring 125 which has been placed under tension through swinging of the beam 31 to charging position will contract, thereby swinging the beam 31 into position transversely of the carriage, so that the feeder tube 35 can be again lowered into the forehearth. A cam 126 is so timed that the reversing valve 80 is operated to effect lowering movement of the beam 31 before the carriage 25 has completed its rearward movement.

During lowering of the tube into the forehearth, as indicated in Fig. 8, the slug of glass is ejected by a cam 127 operating a bleed valve 128 to admit fluid pressure from pressure line 72 past a pressure regulator 129 to line 130 that communicates with the interior of the tube 35. The slug will be remelted in the pool of glass. The tube then enters the glass, and its rearward movement continued, so that the tube can draw up a fresh supply of glass at a point (Fig. 9) removed from the ejected slug. Lowering movement of the tube and beam is arrested by the roller 67 engaging the stop bar 65.

The speed of the motor 42 is controlled by a rheostat 137 which is regulated by an air motor 138, pressure being admitted to opposite sides of the air motor, as desired, by cams 139 and 140. In order to speed up the motor and effect severance of the mold charge from the glass in the bath as shown in Fig. 6, the rheostat is shifted through operation of the cam 139 to reduce the resistance. Upon separation of the withdrawn glass from the pool, the rheostat is operated to again retard the speed of the motor. The rotation of the tube can be interrupted entirely, if desired, during movement thereof into mold charging position, but ordinarily it will be rotated slowly. After the mold charge has been severed, the rheostat is shifted to effect rapid rotation of the tube, so that any depending string of glass will be drawn up against the lower end of the stub, which remains in the tube.

In the charging of molds of considerable horizontal dimension, it is desirable to deposit the mold charge flatwise in the mold, and this manner of depositing a charge can be effected either by slight horizontal movement of the tube at mold-charging position, or by tilting the tube, as above-explained. This tilting movement is effected by admitting air to the cylinder 54 by the use of cams 141 and 142. When fluid pressure is admitted to the lower end of the cylinder, the tube will be rocked in a clockwise direction, and the glass simultaneously caused to issue therefrom, or the tube can first be tilted and then returned in a counter-clockwise direction, while applying expulsive pressure to the glass in the tube, thereby effecting deposit of the glass as indicated in Fig. 13. The tube may also be tilted from a vertical position after severance of the charge, so that the tail end adhering to the glass in the tube, plus rotation of the tube will cause flipping of the said tail end into the remaining slug of glass.

The glass can be deposited as shown in Figs. 12 and 13 by gravity flow, and with little or no extruding pressure. By slight reverse movement of the tube the tail of glass can be caused to fall on the deposited charge and be melted into the same.

Referring now to Fig. 10, I show an arrangement whereby two feeders may be employed for supplying a single mold table. In this case, two forehearths 150 and 151 are provided with which feeding devices 152 and 153, respectively, cooperate. These feeding devices may be each of substantially the form shown in Figs. 1 to 3, and are operated in sequence to deliver mold charges to the mold table 154.

In Fig. 11, I show an arrangement whereby a single feeder can be employed to simultaneously supply a plurality of molds of either the same or different sizes. In this case the feeder tubes are indicated by the numerals 155 and 156 which are integrally or separately formed and can be mounted on a carriage, as in the case of the feeder of Figs. 1 to 3. The feeder tubes are operated in substantially the same manner as is the feeder tube 35 to deposit mold charges in molds 157 and 158.

Referring now to Fig. 14, I show the device employed in the forming of paste mold ware. The glass is extruded from the feeder 159 into a paste mold 160 and extrusion pressure is continued until the mold charge has been fully expanded in the mold, whereupon the glass may be severed in a suitable manner in a desired plane above the mold.

In Figs. 15 to 20, I show another arrangement for effecting movement of the glass into and out of a feeder tube 35a which corresponds to the tube 35. In this arrangement, a needle or plunger 162 is employed to control movement of glass into and out of the tube. The plunger is raised and lowered to effect or assist in effecting retractive and expulsive movements of the glass. For example, when the tube 35a is lowered into the tank, the plunger 162 can be raised to assist in drawing glass up into the tube. This operation of the tube may be supplemental to or in lieu of the use of air suction in the tube, the amount of upward drag exerted by the plunger depending upon the diameter relative to the internal diameter of the tube.

When the tube 35a has been swung to charging position, as shown in Fig. 17, the plunger 162 will be drawn up to effect necking of the gob or shearing, and thereafter air suction can be applied to effect retraction of the glass.

The feeder tube 35a is shown as mounted on the extension 31a of the beam 31, and the tube may be rotated and swung in substantially the same manner as the tube 35. A cylinder 163 is mounted on the arm, and fluid pressure is admitted alternately to the opposite ends thereof, to effect vertical reciprocation of the piston rod 164 that is connected to the plunger 162. Suitable timing means, such as cams mounted on the timing shaft will be employed for effecting vertical movements of the plunger at the proper times.

In order to prevent the glass from sagging unduly at the lower end of the tube 35a while being transferred between the loading and feeding stations, I provide a cup or closure plate 165, which is carried by a piston rod 166 that works within a cylinder 167. By suitable timing valves, fluid pressure will be admitted to the ends of the cylinder 167 to raise and lower the cup 165. The cup may be supplied with heating gas through a flexible pipe 168, or with cooling air, as may be desired.

Horizontal movements of the cup 165 are effected by a cylinder 169 which carries a piston for oscillating a crank arm 170, which is secured to a sleeve 171, that surrounds the piston rod 166. When the cup is in lowered position, fluid pressure will be admitted to the cylinder 169 to cause the cup to be swung beneath the tube 35a, whereupon the cup will be raised into engagement with the tube to support the glass, while it is being transferred from the tank to the feeding station, or to support the glass stub during travel from the feeding station to the tank.

The cylinder 167 is of such length that when the cup is swung out of position beneath the tube 35a, it may be raised a sufficient distance so as not to interfere with the charging of the tube or the shearing operation.

In air feeders of the type wherein a clay tube or bell is positioned above an orifice in the bottom of the forehearth or boot, the tube frequently becomes so highly heated that the glass is caused to lose its color, as for example, in the case of jade glass or various tinted glasses, with the result that streaks are present in the finished ware. By the use of my invention, this fading of the glass is avoided because the feeder tube never becomes heated to incandescence.

It will be understood that changes in size of glass charges can be effected by changes in the timer and the cam discs, as well as by dipping the tube a greater or less distance into the glass pool. Also, it will be understood that for certain sizes of gobs, and where no particular shaping is desired, the glass can be caused to issue from the feeder tube purely by the action of gravity and without supplying air pressure to the tube.

I claim as my invention:—

1. The method of feeding glass which comprises dipping a feeder tube into a pool of molten glass, while creating suction within the tube to effect withdrawal of molten glass from the parent body, moving the tube to feeding position, while retaining the segregated glass by suction, applying extrusive pressure to the glass within the tube to effect extrusion of a portion of the glass, shearing mold charges from the extruded glass, providing suctional force in the tube to retract the unsevered portion of the glass, returning the tube to the parent body of glass, ejecting the glass remaining in the tube, moving the tube to another point in the pool, and repeating the said steps of withdrawing another mass of molten glass, and shearing a charge therefrom.

2. The method of feeding glass which comprises dipping a feeder tube into a pool of molten glass, while creating suction within the tube to effect withdrawal of molten glass from the parent body, moving the tube to feeding position, while retaining the segregated glass by suction, applying extrusive pressure to the glass within the tube to effect extrusion of a portion of the glass, shearing mold charges from the extruded glass, providing suctional force in the tube to retract the unsevered portion of the glass, returning the tube to the parent body of glass, ejecting the glass remaining in the tube, moving the tube to another point in the pool while rotating the same, and repeating the said steps of withdrawing another mass of molten glass, and shearing another charge therefrom.

3. The method of feeding glass which comprises dipping a feeder tube into a pool of molten glass, while creating suction within the tube to effect withdrawal of molten glass from the parent body, moving the tube to feeding position, causing a portion of the glass to issue from the tube in the form of a suspended mass, severing a charge of glass from said mass, and rotating the tube about its own axis after severance of the glass to effect incorporation of the sheared stub into the mass of unsevered glass.

4. The method of feeding glass which comprises dipping a feeder tube into a pool of molten glass, while creating suction within the tube to effect withdrawal of molten glass from the parent body, moving the tube to feeding position, causing a portion of the glass to issue from the tube in the form of a suspended mass, severing a charge of glass from said mass, and rotating and tilting the tube after severance of the glass to effect incorporation of the sheared stub into the mass of unsevered glass.

5. The method of feeding glass which comprises dipping a feeder tube into a pool of molten glass, while creating suction within the tube to effect withdrawal of molten glass from the parent body, moving the tube to feeding position, causing a portion of the glass to issue from the tube in the form of a suspended mass, severing the charge of glass from said mass, and rotating the tube about its own axis after severance of the glass while applying suctional force within the tube, to effect incorporation of the sheared stub into the mass of unsevered glass.

6. Glass-feeding apparatus comprising a vertically-disposed feeder tube, means for moving the said tube in vertical and horizontal directions to dip it into a pool of molten glass, means for rotating the tube about its own axis, means for applying suctional force within the tube to withdraw a mass of molten glass and to hold the same therein during rotation of the tube, means for moving the tube to feeding position, means for extruding a portion of the glass from said tube to form a suspended mass, and means for severing a charge of glass from said mass.

7. Glass-feeding apparatus comprising a vertically-disposed feeder tube, means for moving the said tube in vertical and horizontal directions to dip it into a pool of molten glass, means for rotating the tube, while moving it horizontally in the molten glass, means for applying suctional force within the tube to withdraw a mass of molten glass, means for moving the tube to feeding position, means for extruding a portion of the glass from said tube to form a suspended mass, and means for severing a charge of glass from said mass.

8. Glass-feeding apparatus comprising a vertically-disposed feeder tube, means for moving the said tube in vertical and horizontal directions to dip it into a pool of molten glass, means for applying suctional force within the tube to withdraw a mass of molten glass, means for moving the tube to feeding position, means for extruding a portion of the glass from said tube to form a suspended mass, means for severing a charge of glass from said mass, and means for rotating the tube about its own axis.

9. Glass-feeding apparatus comprising a vertically-disposed feeder tube, means for moving the said tube in vertical and horizontal directions to dip it into a pool of molten glass, means for applying suctional force within the tube to withdraw a mass of molten glass, means for moving the tube to feeding position, means for extruding a portion of the glass from said tube to form a suspended mass, means for severing a charge of glass from said mass, and means for rotating the tube about its own axis, at variable speeds.

10. Glass-feeding apparatus comprising a movable support, a feeder tube carried by said support, means for effecting pneumatic pulsations within the tube, means for raising and lowering the said support, means for imparting traveling movement to the support, and means for swinging said support about a vertical axis during said traveling movement.

11. Glass-feeding apparatus comprising a movable support, a feeder tube carried by said support, means for effecting pneumatic pulsations within the tube, means for raising and lowering the said support, means for swinging said support about a vertical axis, and means for rotating the tube about its own axis on said support.

12. Glass-feeding apparatus comprising a movable support, a feeder tube carried by said support, means for effecting pneumatic pulsations within the tube, means for raising and lowering the said support, means for imparting traveling movement to said support, and means controlled by said movement for effecting swinging movement of the support about a vertical axis.

13. Glass-feeding apparatus comprising a feeder tube, means for raising and lowering the tube, means for effecting traveling movement of the tube from a point of charging to a point of discharge, a closure device for the lower end of the tube, means carried by the closure device for controlling the temperature thereof, and means operating in timed relation to traveling movements of the tube for moving said closure device to and from operative position with respect to the lower end of the tube.

14. Glass-feeding apparatus comprising a feeder tube, means for raising and lowering the tube, means for effecting traveling movement of the tube from a point of charging to a point of discharge, a plunger in the tube, and means for effecting movements of said plunger in directions longitudinally of the tube in timed relation to the movements of the tube, the said plunger serving to control glass contained within the tube.

15. Glass-feeding apparatus comprising a feeder tube, means for raising and lowering the tube, means for effecting traveling movement of the tube from a point of charging to a point of discharge, a plunger in the tube, means for effecting movements of said plunger in directions longitudinally of the tube in timed relation to the movements of the tube, the said plunger serving to control glass contained within the tube, a closure device for the lower end of the tube, and means operating in timed relation to the traveling movements of the tube for moving said closure device to and from operative position with respect to the lower end of the tube.

16. The method of feeding glass which comprises drawing molten glass upwardly from a pool, into a vertically-disposed feeder tube, moving the tube into position above a mold surface, while maintaining the glass therein by suction, relieving the suctional force and applying superatmospheric pressure within the tube, to cause the glass to move into engagement with said surface, thereafter creating suctional force in the tube, to neck the extruded glass, severing the extruded glass while supported on said surface, maintaining suctional force within the tube to support the unsevered stub of glass, and thereafter moving the tube into position above the pool and expelling said stub into the pool.

17. The method of feeding glass which comprises inserting the lower end of a feeder tube into a pool of molten glass, creating suction within the tube to cause a portion of glass to enter the tube, rotating the tube about its own axis and raising the same to effect separation of the withdrawn glass from the pool, and shifting the tube into position above a receiving surface and effecting discharge of glass therefrom.

18. Glass-feeding apparatus comprising a movable support, a feeder tube carried by said support, means for effecting pneumatic pulsations within the tube, means for raising and lowering the said support, means for oscillating said support about a vertical axis, means for revolving the tube about its axis on said support at a plurality of points in its path of oscillation, and means for effecting traveling movement of said support.

19. Glass-feeding apparatus comprising a feeder tube, means for periodically creating pneumatic pulsations within said tube to effect withdrawal of glass from a pool and the discharge thereof at a mold station, pneumatically-actuated means for effecting periodic raising and lowering movements of the tube, pneumatically-actuated means for effecting periodic traveling movement of the tube between the pool and the mold station, a locking element for preventing raising and lowering movements of the tube, means normally urging said locking element toward locking position, and a pneumatically-actuated device effective during operation of the two said pneumatically-operated means, for retaining the locking element in inoperative position.

20. Glass-feeding apparatus comprising a feeder tube, means for periodically creating pneumatic pulsations within said tube to effect withdrawal of glass from a pool and the discharge thereof at a mold station, pneumatically-actuated means for effecting periodic raising and lowering movements of the tube, pneumatically-actuated means for effecting periodic traveling movement of the tube between the pool and the mold station, a locking element for preventing traveling movement of the tube, means normally urging said locking element toward locking position, and a pneumatically-actuated device effective during operation of the two said pneumatically-operated means, for retaining the locking element in inoperative position.

21. Glass-feeding apparatus comprising a feeder tube, means for periodically creating pneumatic pulsations within said tube to effect withdrawal of glass from a pool and the discharge thereof at a mold station, pneumatically-actuated means for effecting periodic raising and lowering movements of the tube, pneumatically-actuated means for effecting periodic traveling movement of the tube between the pool and the mold station, pneumatically-actuated elements for preventing raising and lowering movements of the tube and preventing traveling movement thereof, means normally urging said elements toward locking position, and a pneumatically-actuated device effective during operation of the two said pneumatically-operated means, for retaining the locking elements in inoperative position.

22. The method of feeding glass which comprises dipping a feeder tube into a pool of molten glass, while creating suction within the tube to effect withdrawal of molten glass from the parent body, moving the tube to feeding position, and causing the glass to issue from the lower end of the tube in the form of a suspended mass against a charge receiving surface in an elongated shaping mold, while swinging the lower end of the tube over the charge-receiving surface, about a transversely-extending axis near the upper end of the tube.

23. The method of feeding glass which comprises dipping a feeder tube into a pool of molten glass, while creating suction within the tube to effect withdrawal of molten glass from the parent body, moving the tube to feeding position, and causing glass to issue from the lower end of the tube in the form of a suspended mass against a charge receiving surface in an elongated shaping mold, while swinging the lower end of the tube over the charge-receiving surface, about a transversely-extending axis near the upper end of the tube, and reversing the direction of movement of the tube to bring it into position above the deposited glass at an intermediate point, during discharge from the tube.

24. The method of feeding glass which comprises drawing molten glass upwardly from a pool, into a vertically-disposed feeder tube, moving the tube into position above a mold surface, while maintaining the glass therein by suction, relieving the suctional force to cause the glass to move into engagement with said surface, thereafter creating suctional force in the tube, to neck the extruded glass, severing the extruded glass while supported on said surface, maintaining suctional force within the tube to support the unsevered stub of glass, and thereafter moving the tube into position above the pool and expelling said stub into the pool.

ANDREW J. BLACK.